US012591791B2

(12) United States Patent
Dumitru et al.

(10) Patent No.: US 12,591,791 B2
(45) Date of Patent: Mar. 31, 2026

(54) FAR EDGE/IOT INTELLIGENCE DESIGN AND APPARATUS FOR HUMAN OPERATORS ASSISTANCE

(71) Applicant: Dell Products L.P., Round Rock, TX (US)

(72) Inventors: Aurelian Dumitru, Round Rock, TX (US); Eric L. Caron, Ottawa (CA); Nalinkumar Mistry, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 861 days.

(21) Appl. No.: 17/822,340

(22) Filed: Aug. 25, 2022

(65) Prior Publication Data

US 2024/0070480 A1     Feb. 29, 2024

(51) Int. Cl.
*G06N 5/022* (2023.01)
*G06Q 10/0635* (2023.01)
*G08B 21/02* (2006.01)

(52) U.S. Cl.
CPC ......... *G06N 5/022* (2013.01); *G06Q 10/0635* (2013.01); *G08B 21/02* (2013.01)

(58) Field of Classification Search
CPC ...... G06Q 10/0635; G08B 21/02; G06N 5/22; G06N 20/00
See application file for complete search history.

(56) References Cited

U.S. PATENT DOCUMENTS

| | | | | |
|---|---|---|---|---|
| 11,048,498 | B2 * | 6/2021 | Malladi | H04L 67/561 |
| 11,178,010 | B2 * | 11/2021 | Kozhaya | G06N 5/04 |
| 11,295,166 | B2 * | 4/2022 | Han | G06N 20/10 |
| 12,056,608 | B2 * | 8/2024 | Rocznik | G06N 3/0464 |
| 12,131,242 | B1 * | 10/2024 | Nair | G06N 3/045 |
| 2020/0151619 | A1 * | 5/2020 | Mopur | G06N 3/08 |
| 2020/0167202 | A1 * | 5/2020 | Huang | G05B 13/0265 |
| 2021/0133607 | A1 * | 5/2021 | Stubbs | G06N 20/00 |
| 2024/0012729 | A1 * | 1/2024 | Elkhatib | G06F 11/3006 |
| 2025/0077303 | A1 * | 3/2025 | Nair | G06F 8/61 |
| 2025/0077985 | A1 * | 3/2025 | Merry | G06Q 30/0201 |

OTHER PUBLICATIONS

Choshen et al., "On the Weakness of Reinforcement Learning for Neural Machine Translation", Conference Paper at ICLR 2020, Apr. 26, 2020, 14 pages.
Fujimoto et al., "Benchmarking Batch Deep Reinforcement Learning Algorithms", arXiv:1910.011708v1 [cs.LG] Oct. 3, 2019, 13 pages.

* cited by examiner

*Primary Examiner* — Dylan C White
(74) *Attorney, Agent, or Firm* — Workman Nydegger

(57) ABSTRACT
One example method is performed at a far edge device and includes collecting data with one or more IoT (Internet of Things) devices, feeding the data to a feedback loop that includes multiple stages, running the feedback loop, providing learning information, comprising output from one or more of the stages of the feedback loop, to a central manager by way of a learn interface, accessing learning information generated by one or more other far edge devices, and updating the feedback loop using the learning information generated by the one or more other far edge devices.

18 Claims, 14 Drawing Sheets

FAR EDGE/IOT INTELLIGENCE DESIGN AND APPARATUS FOR HUMAN OPERATORS ASSISTANCE

FIELD OF THE INVENTION

Embodiments of the present invention generally relate to generation and provision of information to support human decision making. More particularly, at least some embodiments of the invention relate to systems, hardware, software, computer-readable media, and methods, for making a human operator aware of impending circumstances and events so as to enable the human operator to make a decision and/or take a course of action based on that information.

BACKGROUND

Turning data into actionable information that humans can use in decision-making has been an ages-old problem. Data speed, data volume, and data variety unlocked by the latest advancements in information technologies, have made the transformation of data, into human-friendly information, orders of magnitude more complex than before.

On the other side, data consumption presents challenges as well, since there is a need for humans to handle increasingly complex situations on a daily basis. To illustrate, operating heavy machinery in an industrial plant, driving recent generation vehicles in rush-hour traffic, and making investment decisions, are all examples of living in the society of today. Sometimes, decisions made, or not made, have an immediate impact, such as, for example, a manufacturing plant caught on fire because there was no human response, such as intervention, to fire warnings. Other times, the effects of decisions taken, or the failure to take a decision, may be manifested months or years later, such as in the form of bankruptcies, or the loss of a competitive lead, for example. Thus, a common theme presented here is a gap between the digital, or data, world and the so-called real world. Following is a brief discussion of some typical problems known to exist in this field.

The first example of such problems concerns decision-making, and the timing for taking corresponding actions once a decision has been made. Particularly, turning, or transforming, data into real time-critical actions continues to be a major challenge. Contributing factors to this challenge may include limited data know-how, sub-optimal compute placement and utilization, and lack of trust between the digital, data, world and the real world.

Another problem concerns uneven global knowledge management. Particularly, turning data into information and taking action is still very much a one-way street. Having a feedback loop to augment or enhance the data part based on knowledge gleaned by humans from the information is not a widely adopted approach. Relevant causes can include data quality issues such as errors in the data, for example, rigid data transformation methodologies, and incongruent interoperability between components of the data transformation pipelines. The lack of feedback loops between the consumer of the information and the data source is another major factor.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
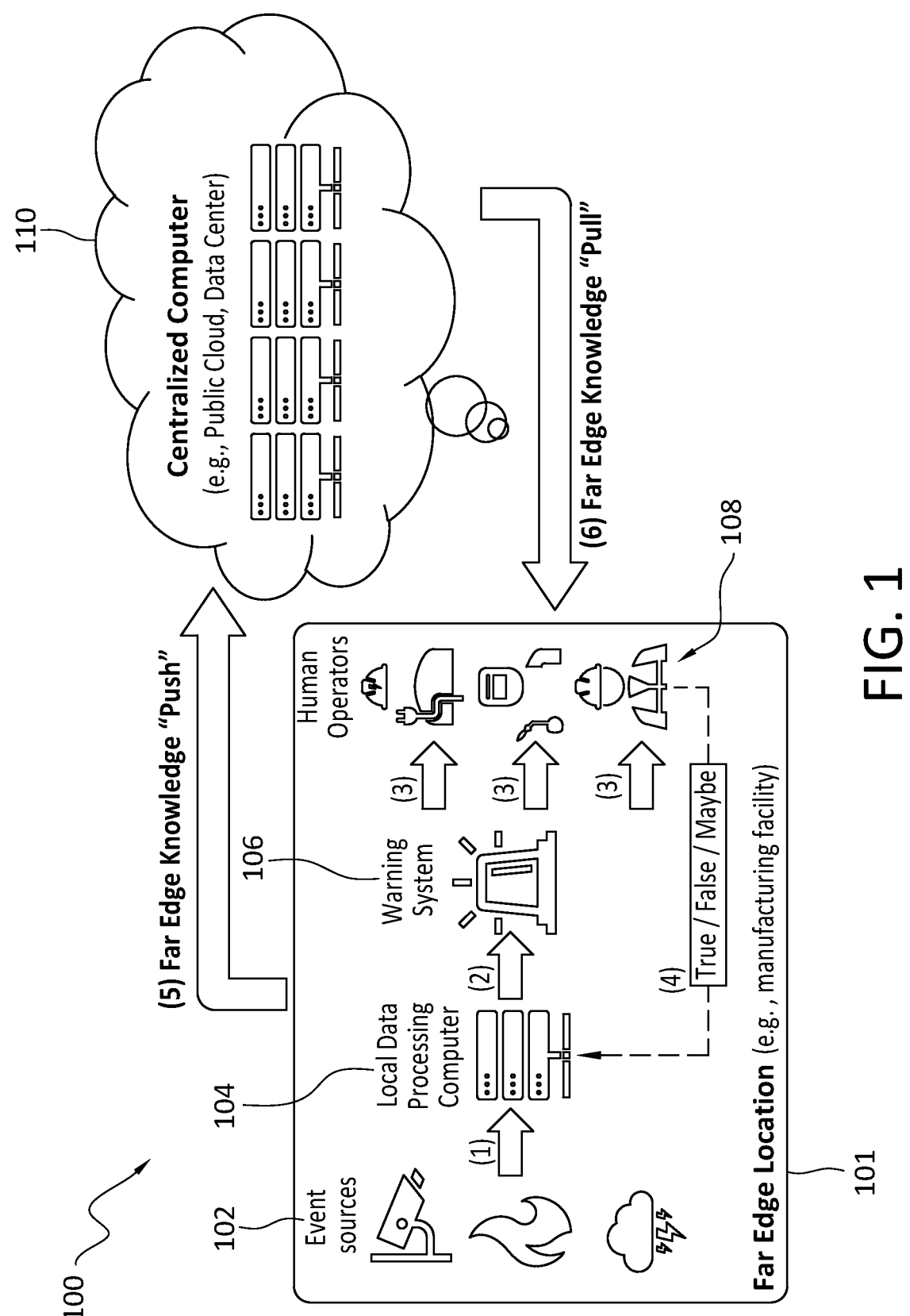
FIG. 1 discloses an example high level architecture.

Embodiments of the present invention generally relate to generation and provision of information to support human decision making. More particularly, at least some embodiments of the invention relate to systems, hardware, software, computer-readable media, and methods, for making a human operator aware of impending circumstances and events so as to enable the human operator to make a decision and/or take a course of action, corresponding to the decision, based on that information.

In general, example embodiments of the invention may operate to bridge the gap between the digital, or data, world, and the real world, in the context of various scenarios. In the interest of providing possible solutions to real world problems, some example embodiments may address real world situations with the potential for negative impact to entities such as, but not limited to, an individual, or a business.

To illustrate, an embodiment may help to avoid the occurrence of personal injuries by putting up early warnings to the operators working in an industrial facility. As another example, an embodiment may operate to prompt a fleet manager for a logistics company to adjust routes and schedules based on information gleaned from business process data. Thus, some example embodiments may combine data intelligence know-how and system technologies, with elements of human cognition.

It is noted that the aforementioned use cases, and the other use cases disclosed herein, such as a use case involving forklift operations, are presented only by way of illustration and are not intended to limit the scope of the invention in any way. In more detail, some example embodiments embrace a decentralized intelligent assistance, to human operator, approach that may aggregate and share data, information, learning, knowledge, and mandatory and other actions, among a group of one or more far edge sites, and with a combination of centralized and distributed/local controls implemented for the benefit and well-being of human operators, such as those working in industrial or office facilities for example. Note that as used herein, the 'far edge' includes, but is not limited to, the infrastructure deployed in a location farthest from the cloud data centers and closest to the users, whereas near edge is the infrastructure deployed between the far edge and the cloud data centers.

Although the industry has been working on attempts at similar solutions for some time, the current state-of-the-art represented by the likes of Amazon Alexa and Google Echo lacks the ability to cross data and expertise domains, for example, the ability to gather live feeds from surveillance cameras and turn data from those feeds into notifications delivered via a channel such as SMS (Short Message Service). Conventional approaches also lack the ability to construct cross-domain knowledge that is highly actionable by human operators. Finally, the current state-of-start solutions lack the ability to leverage multiple human cognitive capabilities to express the urgency of a particular situation, and to suggest corresponding mandatory actions concerning that situation.

Thus, some example embodiments may blend data management abilities and functions with several types of machine learning (ML), such as supervised, unsupervised, federated, reinforcement, and transfer, for example. Some example embodiments may also leverage AI (Artificial Intelligence) to take timely actions to avoid potentially dangerous situations. Some embodiments may also involve a human operator as an integral part of the knowledge creation, accumulation, and transformation lifecycle.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, at least some embodiments of the invention may provide that data gathered from various sources may be used as a basis to identify an actual, or potential, situation, and to identify a corresponding decision and/or course of action relating to that situation. An embodiment may enable collaboration between a human operator and a machine in such a way that the machine enables the human operator to avoid the occurrence, and/or consequences of, a particular situation.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

Note that as used herein, the term 'data,' such as data gathered and/or generated by an event source or IoT device, for example, is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. As used herein, 'information' may comprise, but is not limited to, data and metadata.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

A. Aspects of Some Example Embodiments

At least some example embodiments are directed to an approach that may be far edge-enabled, that is, may be implemented in a far-edge computing environment, yet is also able to interoperate with higher level system control functions implemented environments such as a public cloud, or on premise.

With reference now to the example operating environment 100 disclosed in FIG. 1, example embodiments may employ four different communication streams, any or all of which may be implemented at, and/or in conjunction with, each far edge site 101 in a group of far edge sites. The first of these communication streams may comprise a raw data flow from event sources 102, which may comprise IoT (Internet of Things) devices, to a local data processing compute infrastructure 104. This raw data flow is denoted at (1) in FIG. 1, and may implement a flow of raw data between event sources 102 of sensory data, such as surveillance cameras or heat/smoke detectors for example, and the compute infrastructure 104 deployed onsite in a site such as a manufacturing plant or logistics warehouse, for example. Further information concerning these elements and associated entities is provided elsewhere herein.

Another of the communication streams that may be implemented by some example embodiments is a machine-human interactivity flow that may comprise several elements. These elements may include, for example, information presentation from the compute infrastructure 104, to a warning system 106. This element is denoted at (2) in FIG. 1. In turn, in the next element of the machine-human interactivity flow, the warning system 106 may provide information to human personnel 108 for consumption by the human personnel 108, as shown at (3) in FIG. 1. The next element may involve generation and transmission of a human personnel 108 response that is based on the information received (3) from the warning system 106, as shown at (4) in FIG. 1. Further information concerning these elements and associated entities is provided elsewhere herein.

With continued reference to the example of FIG. 1, another of the communication streams that may be employed in some embodiments is a far edge knowledge "push" from the far edge solution stack, that is, the entities and functionalities, implemented in the Edge Location 101, to a centralized compute environment, as denoted at (5) in FIG. 1. In general, this communication stream may be used by the far edge site 101 to share, with the centralized compute environment 110, that (a) a particular condition has occurred, as determined by the event source 102 and/or compute infrastructure 104, (b) human personnel have been notified that the event has occurred, and (c) the reactions of the human personnel to the occurrence of that event.

Finally, and with continued reference to the example of FIG. 1, another communication stream that may be employed in some embodiments is a far edge knowledge "pull" from the centralized compute environment 110 to the far edge solution stack implemented in the far edge site 101, as denoted at (6) in FIG. 1. This communication stream may be used by the centralized compute environment 110 to share updates, and otherwise communicate, with the far edge site(s) 101. Such updates may include, for example, reconfigurations, updates to the AI/ML (Artificial Intelligence/ Machine Learning) models running on a far edge knowledge manager instance.

Thus, as indicated by the example of FIG. 1, some embodiments may employ a Knowledge+Learning+Sharing distributed stack consisting of what may be referred to herein as central, and edge knowledge manager, instances, examples of which are disclosed in FIG. 2, discussed below. Each knowledge manager instance may implement variable degrees of distributed data, legacy applications, AI/ML entities, and human cognition interfaces. One role, and possibly a primary role, of the distributed knowledge management approach implemented in some embodiments is to foster human-machine collaboration and, finally, assist human operators 108 in avoiding potentially dangerous situations, or in dealing with other situations that have particular specified characteristics.

By enabling the unincumbered flow of training, learning, and fact or goal based experimenting results between locations, a far edge site 101 may leverage the knowledge, that is, the learnings, gathered by other locations, such as other far edge sites. Therefore, once a dangerous situation, such as driving a loaded forklift over a speed limit specified for a particular type of environment, that had been tagged as such by one of the far edge sites 101, such as by applying ML to aggregated sensor data received from an event source 102), all other far edge sites 101 will thus "know" about that event, and those far edge sites 101 may also "know" when and how to warn human operators, respectively associated with those far edge sites 101, about that event.

Figure 2:
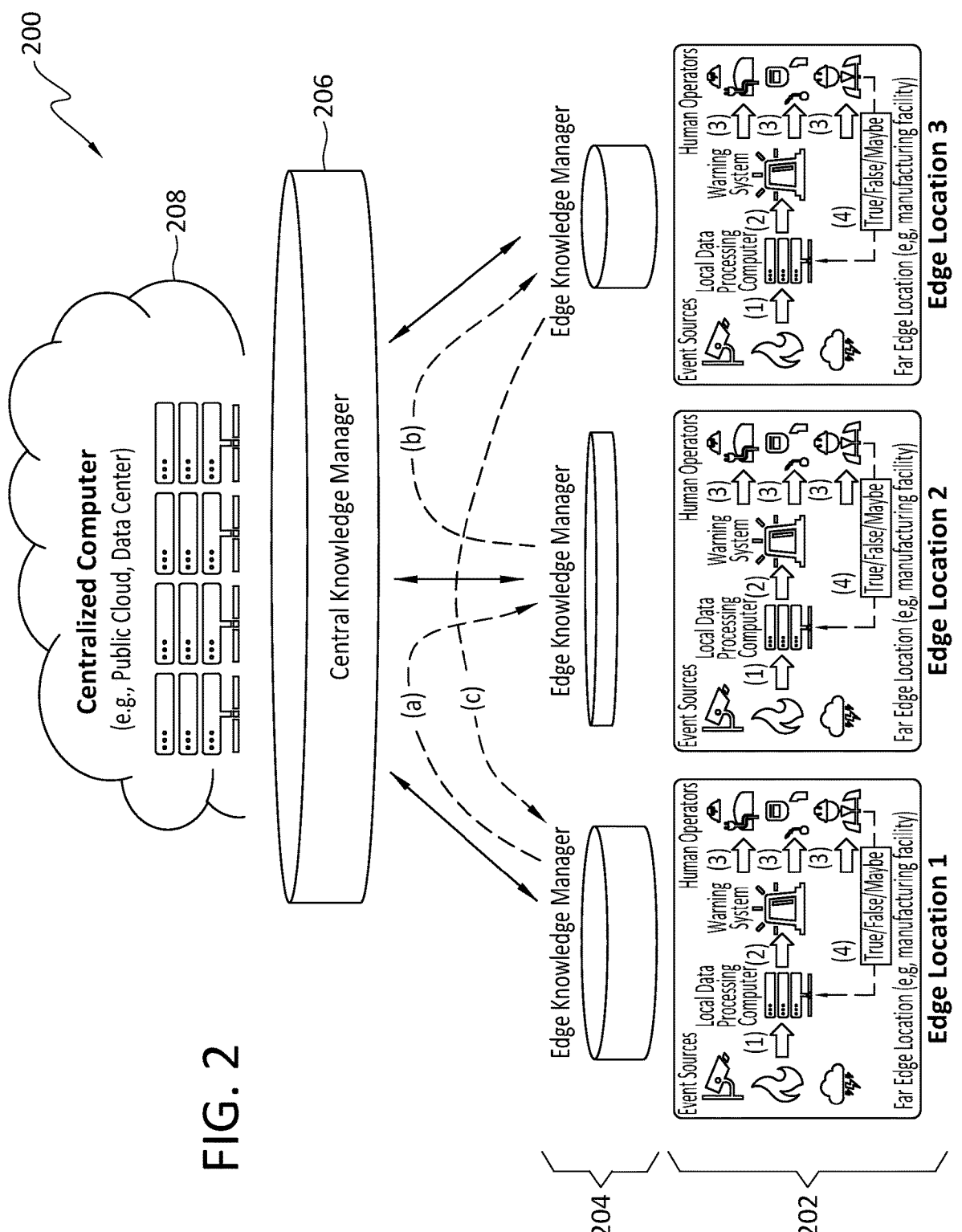
FIG. 2 discloses an example knowledge build and share system view.

As shown in the example configuration 200 in FIG. 2, one or more Edge Locations 202, any one or more of which may be the same as, or similar to, the far edge site 101, may each instantiate a respective instance 204 of an edge knowledge manager. The edge knowledge manager instances 204 may, in turn, communicate with a central knowledge manager 206 which, in some embodiments, may be implemented at a centralized compute site 208, such as a public cloud site, or cloud datacenter, for example.

In the illustrative example of FIG. 2, Edge Location 1 has identified a potentially dangerous situation, for example, the leakage currents in electric motors powering a car assembly line are reaching higher than permissible levels that can cause electrocution and, possibly, death. The recommended action in this illustrative example may be to stop the assembly line and raise a ticket with the assembly line support technicians to come and fix the problem.

In FIG. 2, the dotted line (a) shows how that information about the potentially dangerous situation, along with information about a proposed remediation action, is being shared by Edge Location 1 with Edge Location 2. This sharing may occur either directly, or point-to-point, between Edge Location 1 and Edge Location 2, or via the central knowledge manager 206, that is, from Edge Location 1 to the central knowledge manager 206 to Edge Location 2. In either case, Edge Location 2 may choose to act upon or drop the new learning notification, though Edge Location 2 may, at least, make sure that Edge Location 3 has also received the notification, as shown by the broken line (b). Now, all three Edge Locations 1, 2, and 3, along with the central knowledge manager 206 and the centralized compute site 208, "know" how to detect and act upon occurrences of leakage currents in assembly line electric motors. Note that, as indicated by the broken line (c), the Edge Location 3 may provide information to one or more of the other Edge Locations, such as Edge Location 1 for example.

B. Distributed, Yet Collaborative, Learning

B.1 Distributed Learning

As noted elsewhere herein, the implementation of knowledge manager instances may embody variable degrees of distributed data, legacy applications, AI/ML entities, and human cognition interfaces. With attention now to the example of FIG. 3, a brief outline is provided of some considerations that may inform the technical design of some example embodiments. Particularly, FIG. 3 discloses an example sensor data-to-human action flow 300. In general, the flow 300 may comprise a sequence of events that may enable a human operator avoid potentially dangerous situations.

Initially, a sensor 302, or other IoT device, may generate and/or collect data, such as data about a physical environment in which the sensor 302 is operating. The data obtained by the sensor 302 may be collected 303 and subjected to data processing 305. The processed data may be checked, and the check may result in the detection 307 of an abnormal situation. The fact that an abnormal situation has been detected, and information about that situation, may then be used as a basis to generate a warning 309 that is perceptible by a human. In response to the warning, a human may then take one or more actions 311, such as remedial actions to resolve the abnormal situation. Note that it may be implicit in 311, or elsewhere, that the human operator makes a decision to take the remedial action. Note further that example embodiments of a data analysis system may be installed that include one or more defined thresholds which may be used as the initial baseline to trigger warnings.

Figure 3:
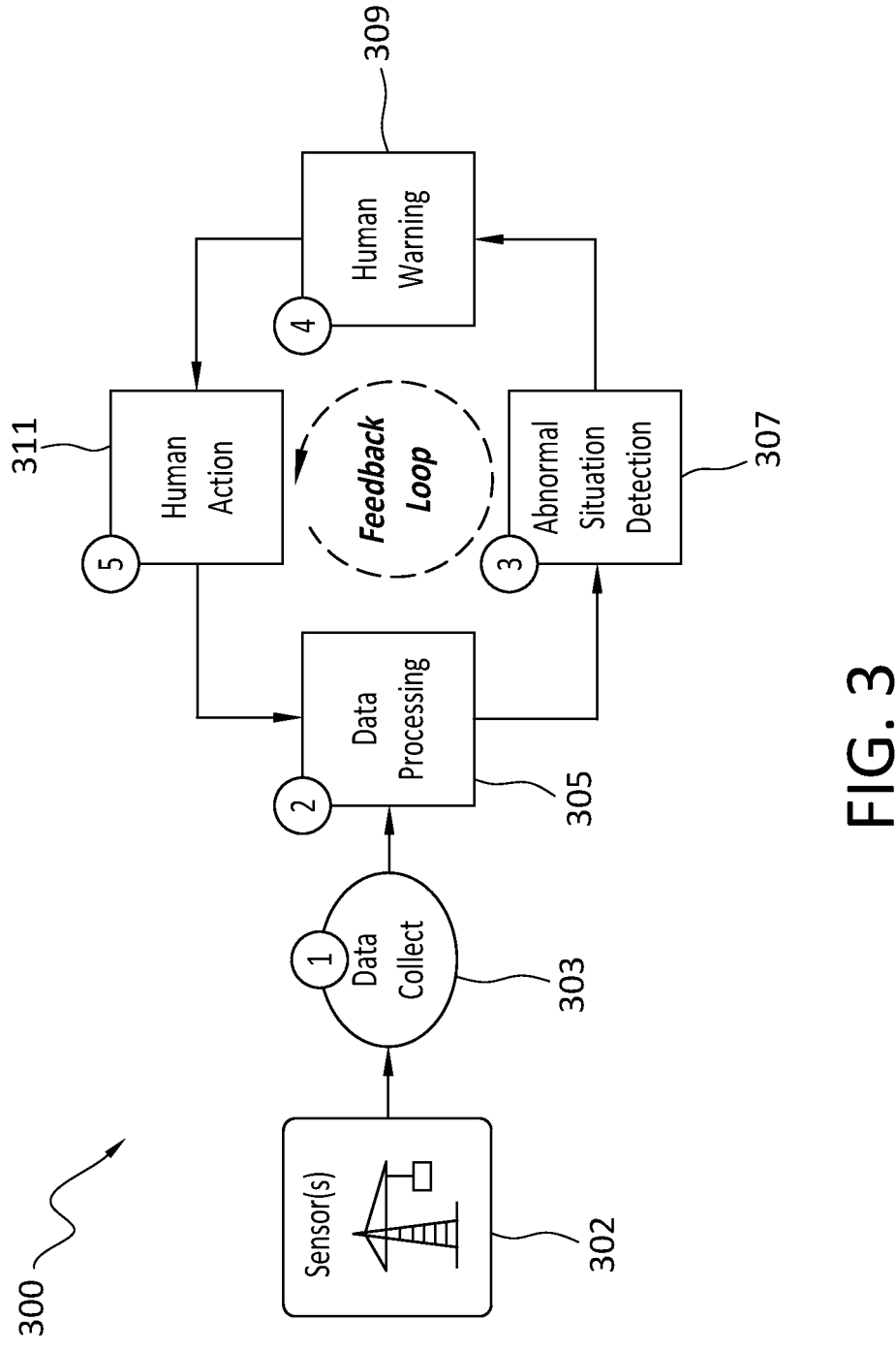
FIG. 3 discloses a transformation of sensor data to human action flow.

With continued reference to the example of FIG. 3, it can be seen that elements 2 through 5 (references 305-311) may collectively form a feedback loop that may enable example embodiments to capture the data inputs, detect the potentially abnormal/dangerous situation, observe the human action, and apply feedback loop control mechanisms to improve the system and human behavior on the next occurrence of the same, or similar, potentially faulty condition. Note, that a goal of some embodiments is to share this knowledge across all Edge Locations in a group of Edge Locations, and to help ensure that the knowledge gathered at one Edge Location is being shared among other existing, and/or future, Edge Locations.

Figure 4:
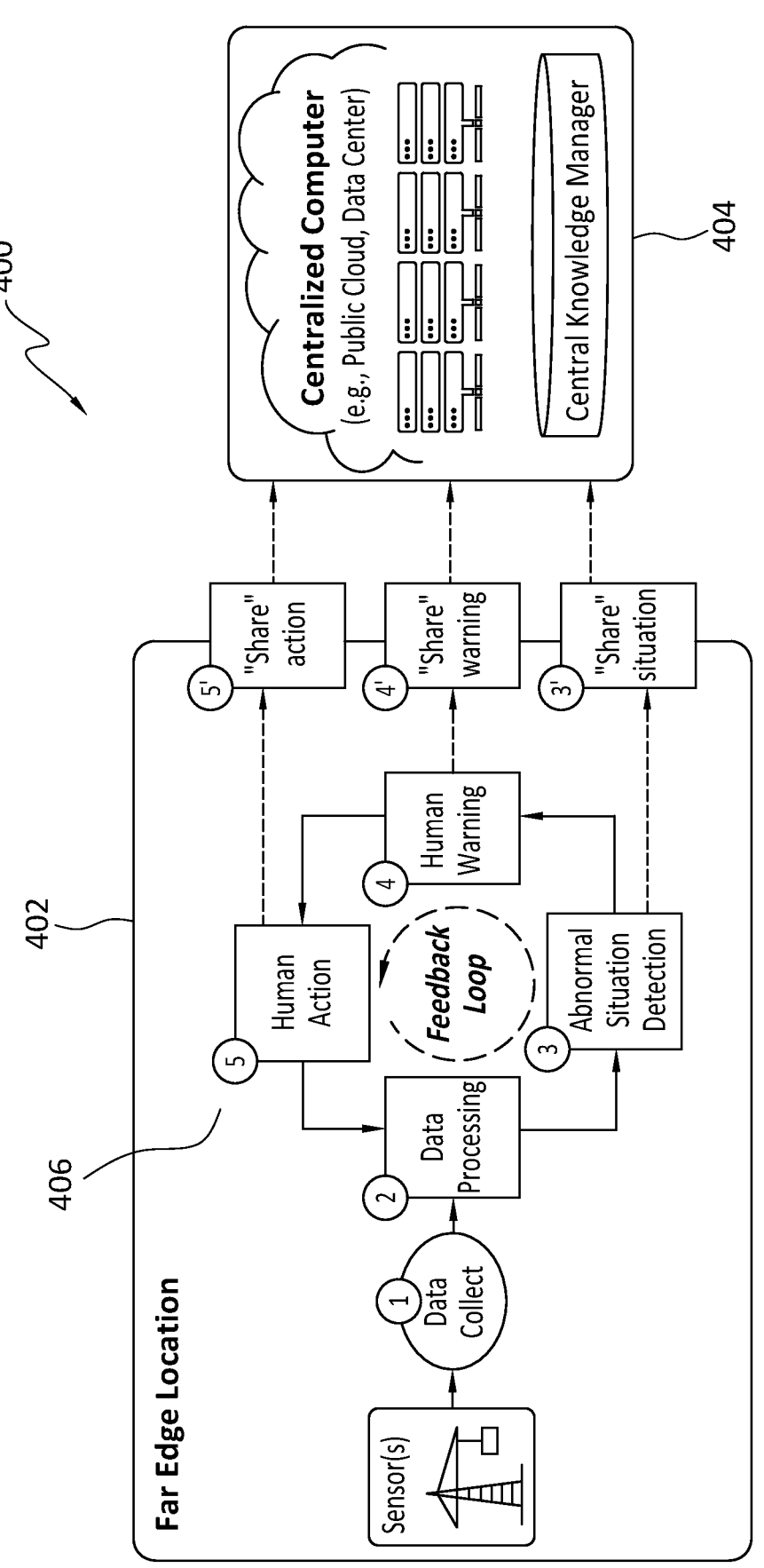
FIG. 4 discloses a knowledge sharing mechanism between a far Edge Location and a central manager.

Thus, reference is now made to FIG. 4, which discloses a configuration 400 including a knowledge sharing mechanism in which a far edge site 402, which may be one of a group of far edge sites, shares its learnings with a central knowledge manager 404. As shown, the far edge site 402 may implement a feedback mechanism 406, one example of which is disclosed in FIG. 3 discussed above. At various points/times in the feedback mechanism, information may be shared by the far edge site 402 with the central knowledge manager 404.

In more detail, what may be shared between the far edge site 402 and the central knowledge 404, in the example of FIG. 4, are insights that describe the abnormal situation, the warnings that had been generated, whether automatically or manually, and what were the actions taken by the human operators. The information being shared by the far edge site 402 may also include information about the outcome of the performance of the actions taken by the human such as, for example, whether and to what extent such actions were effective in remedying the abnormal situation, and whether any problems occurred as a result of the implementation of those actions. In example embodiments, the Situation-Warning-Action (SWA) combination, which may be implemented as associate arrays, may constitute the most atomic unit of knowledge that feeds the applications and services that may underpin various aspects of such example embodiments.

In the particular example of FIG. 4, information may be shared by the far edge site 402 with the central knowledge manager 404 at various stages of the feedback loop 406. Thus, for example, information about an abnormal situation that has been detected may be shared, as shown at 3'. As another example, information about a warning that has been generated and sent to a human may be shared, as shown at 4'. Finally, information one or more corresponding actions taken by the human may be shared, as shown at 5'.

In order to enable information and knowledge to flow freely between Edge Locations, some embodiments may include a Learn interface that may yield the collective learning. This is disclosed in FIG. 5 which generally depicts various knowledge sharing and management interfaces between a far edge site and a central knowledge manager. Particularly, FIG. 5 discloses a configuration 500 which may include one or more far edge sites 502 that may communicate with a central knowledge manager 504. An instance of a Learn interface 506 may be implemented in the far edge site 502. Information may be shared by the far edge site 502 with the central knowledge manager 504 by way of a knowledge sharing mechanism 508 that may comprise push/pull and learning functionalities.

The push/pull function may enable information to be pushed and/or pulled between the far edge site 502 and the central knowledge manager 504. To illustrate, the central knowledge manager 504 may include information, such as about events that have occurred at other far edge sites, that may be pushed to, or pulled by, the far edge site 502, such as by way of the Learn interface 506. This information may be provided to the far edge site 502 by the central knowledge manager 504 and/or information may be provided by the far edge site 502 to the central knowledge manager 504.

Thus, the flow of information between the far edge site 502 and the central knowledge manager 504 may be bidirectional in nature. Further, and as indicated by the broken lines in FIG. 5, the elements of the feedback loop of the far edge site 502 may be the source, and/or recipient, of information.

Figure 5:
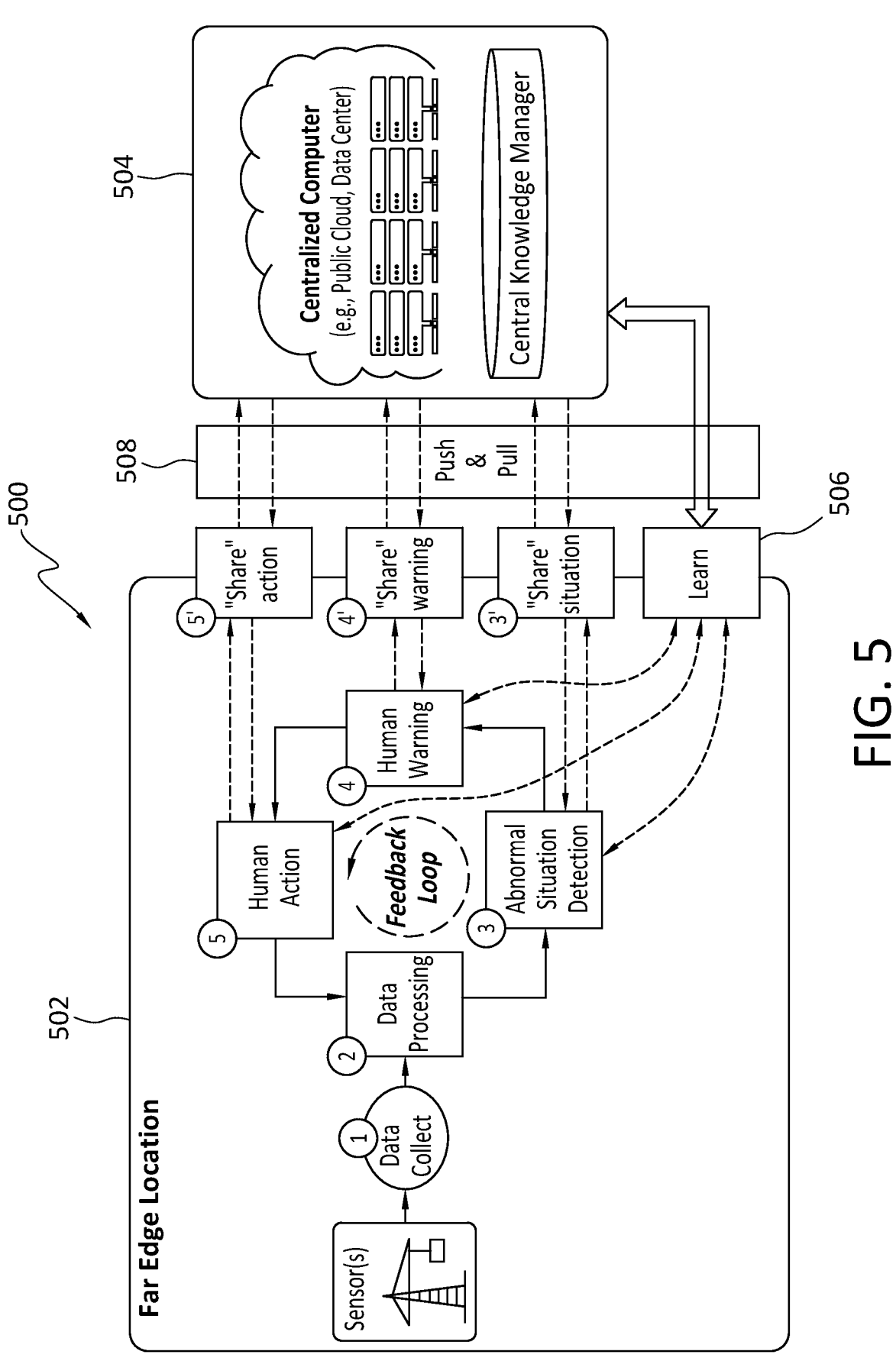
FIG. 5 discloses a knowledge sharing mechanism with push/pull and learning.
Figure 6:
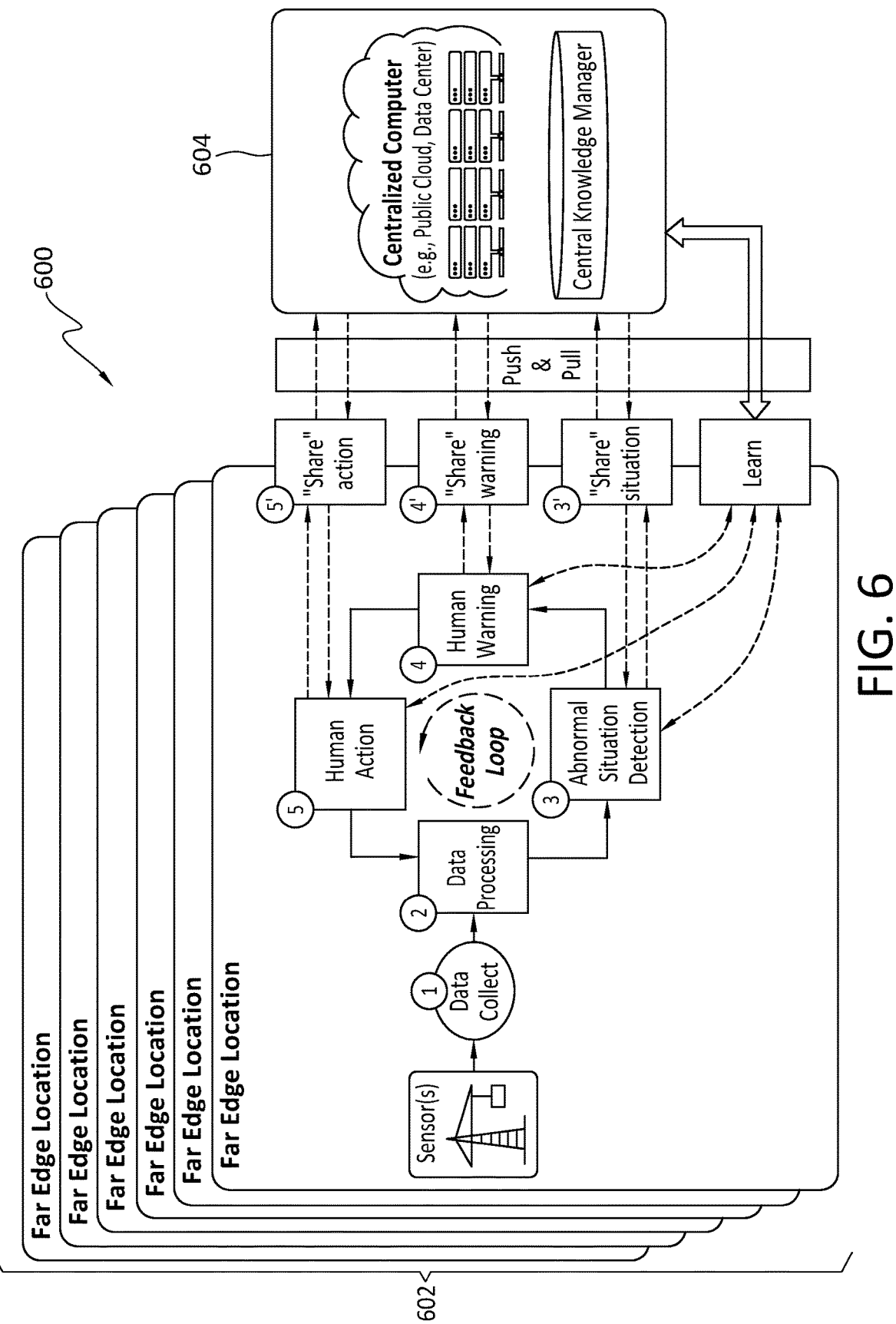
FIG. 6 discloses a multi-site knowledge management mechanism.

FIG. 6 discloses a configuration 600 which may be similar, or identical, to that of FIG. 5 except that multiple sites, such as far edge sites 602, are disclosed that may communicate with a single central knowledge manager 604. That is, FIG. 6 discloses a macroscale view of a multi-site implementation that includes a multi-site knowledge management mechanism. For the sake of simplicity, FIG. 6 omits elements such as DevOps/CI/CD pipelines, data replication channels, operational monitoring and alerting, security and governance services, infrastructure management services, and other elements that may be employed in, or by, some embodiments.

B.2 Collaborative Learning

Figure 7:
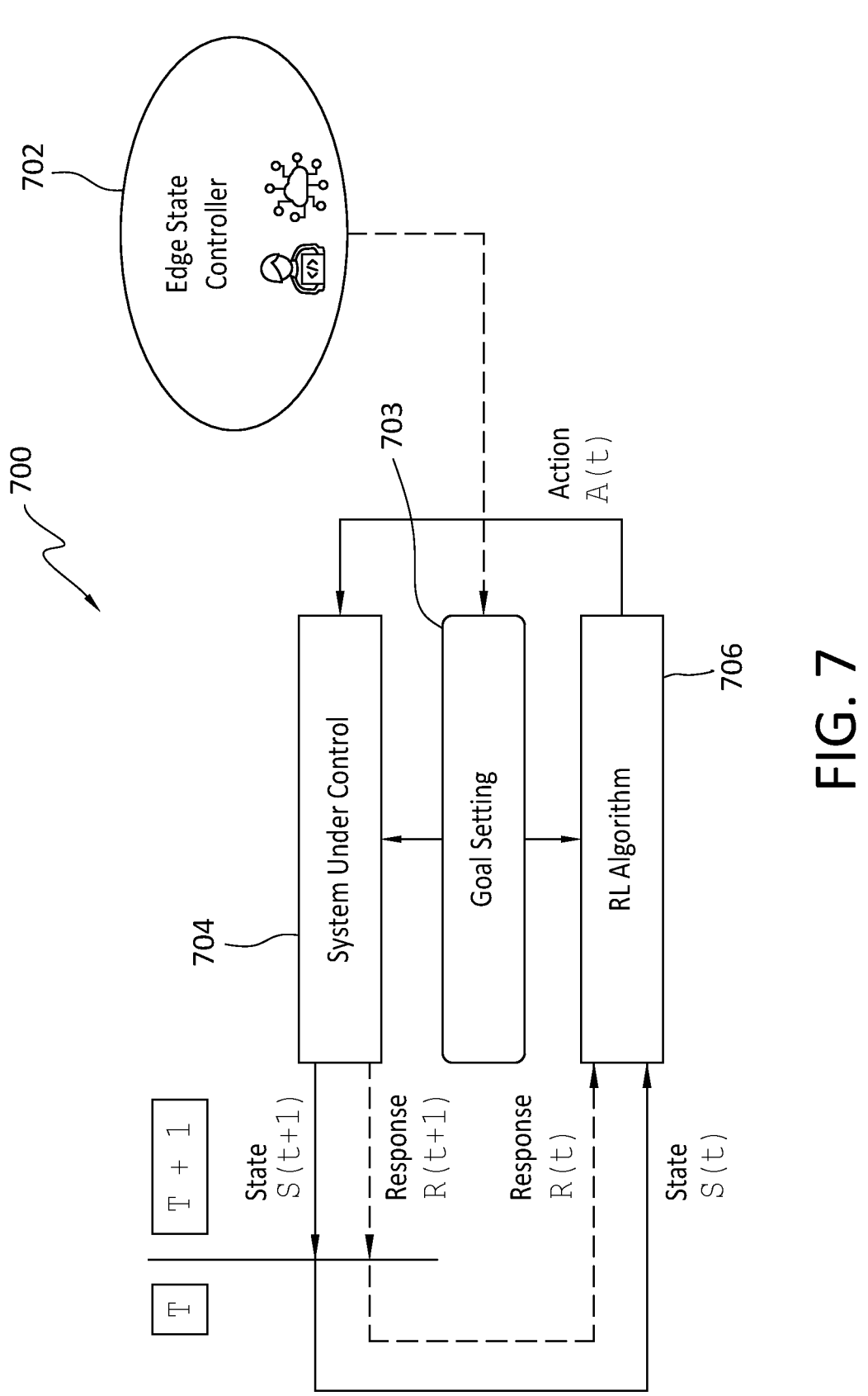
FIG. 7 discloses a reinforcement learning flow.

Following is a discussion of aspects of collaborative learning approaches according to some example embodiments. This section also introduces an example high-level architecture of a software stack that may be employed in some embodiments. For local learning processes, Reinforcement Learning (RL) may be employed as the underlying mechanism for detecting and handling potentially dangerous situations, or other situations which may possess certain specified characteristics. FIG. 7 discloses one example of a reinforcement learning flow, denoted at 700, which may also be referred to simply as a 'learning process.'

The learning process 700 may begin with an edge state controller 702 (see also, FIG. 9) setting 703 the desired operational state of the System Under Control (SUC) 704 via a goal setting parameter or state. In some example, but non-limiting, embodiments, triggering thresholds for the system may be set, for example, to avoid potentially dangerous situations, and/or to remediate dangerous conditions and circumstances that have been detected.

Next, an RL (Reinforcement Learning) algorithm 706 may start modifying the state of the SUC 704 by way of Action A(t) commands (note that 't'=time). Then, the RL algorithm 706 may quantify the System Response R(t), qualify the System State S(t) and compare them with the goal setting 703 introduced earlier. The two readings from the system, namely, the Response R(t) and State S(t), in correlation with Goal Setting may lead to adjustments of the RL Algorithm 706 which may then issue a new Action A(t+1) command, and the next learning cycle may then begin.

Note that the t and t+1 notations shown in FIG. 7 signify the behavior of the system at consecutive points in time. Using incremental time notations such as these may be needed because the behavior of the overall system changes over time based on variety of factors that may be more or less correlated with the system "learning" how to respond to known or unforeseen conditions. The fact that RL algorithms can accommodate the stateful operation of a system may make the RL algorithms better suited for use in example embodiments, as compared with other types of ML algorithms such as linear or logistic regression, for example.

Example implementations and uses of RL according to some embodiments may include various enhancements. Two examples of such enhancements are discussed below.

With regard to the first enhancement, and referring again to the example of FIG. 7, in the earlier stages of the RL learning process, example embodiments switched from active learning to passive learning by letting the RL algorithm observe the system behavior, namely State and Response, to signals issued by existing componentry—for example, a steel mill temperature is reaching dangerous levels—and the actions taken by humans or automated fail-safe controls and model those behaviors using mathematical formulas. This approach may help embodiments of the invention to accelerate the quality of the learning at the beginning of the training cycle. By way of contrast, an industry-standard alternative is to let the algorithm randomly explore all possible states to begin to decode how to adjust to a perfect control and response profile. Taking the industry-standard approach, rather than the approach disclosed in FIG. 7, may well have caused more potentially dangerous situations, instead of helping avoid them.

Concerning the second example enhancement, the RL implementation by some example embodiments may comprise use of a concept that may be referred to herein as 'learning stages.' Briefly, a learning stage refers to a known-good state of the RL algorithm as determined by control parameters defined before or during the learning cycle, for example prediction accuracy, and response timing. Because conventional RL algorithms are known for very poor management of biases learned during a training phase, having a method for rolling back the RL algorithm to a known-good state, as in some example embodiments, may avoid having to start over the learning process, thereby shortening the training phase, enhancing learning efficiency, and offering case owners, or users, the ability to release incremental versions of the model that are "good enough" to meet technical requirements without having to start over with each new release.

In some example embodiments, the RL Learning Stages are the starting points for the Transfer Learning (TL), discussed hereafter. Once the RL learnings generated locally, such as at a far edge site, reach a certain level of "maturity," those learnings may need to be "socialized" with, for example, other far edge sites and/or with the central knowledge manager. The mechanism that some example embodiments may use for enabling knowledge cross-pollination between sites such as far edge sites and a central knowledge manager is Transfer Learning.

In general, the theory behind TL is that units of learning, which may be trained elsewhere, may be used to jumpstart the training of higher-level ML models. More practical examples of TL show that units of learning may also be used for stitching together complex or discrete inference models built to address specific system conditions. Taking TL beyond the theory and applying it efficiently in highly heterogeneous and highly dynamic systems, such as the examples disclosed herein, may present several challenges, among which one of the biggest may the ability to apply the best-effort learning to the proper, system, behavior at the best time. Any misalignment between learning, action, and timing, is likely to produce detrimental results and risk causing human injuries and/or other problems and damage, as opposed to preventing these things.

To support the highly dynamic and highly heterogeneous nature of the system, some example embodiments may employ what may be referred to herein as Staging Areas (see FIG. 8, discussed below) to publish versions of the learnings at each site, such as far edge sites for example, to: (1) let the local RL/TL componentry pick the most appropriate unit of learning candidate; and (2) make units of learning available to other far edge sites as they are being announced.

Note that by taking an approach contrary to that of some embodiments, that is, by not offering each far edge site the ability to pick and choose the best available learning for the condition at hand and, instead, forcing all sites to blindly adopt learnings generated elsewhere can negatively impact each the ability of each site to operate autonomously, and may thus lead eventually lead to a system-level collapse. This also creates the risk of deadlocking the overall system since learning becomes stale, rigid, and, after few training cycles, completely inadequate to handle even the most basic situations.

Figure 8:
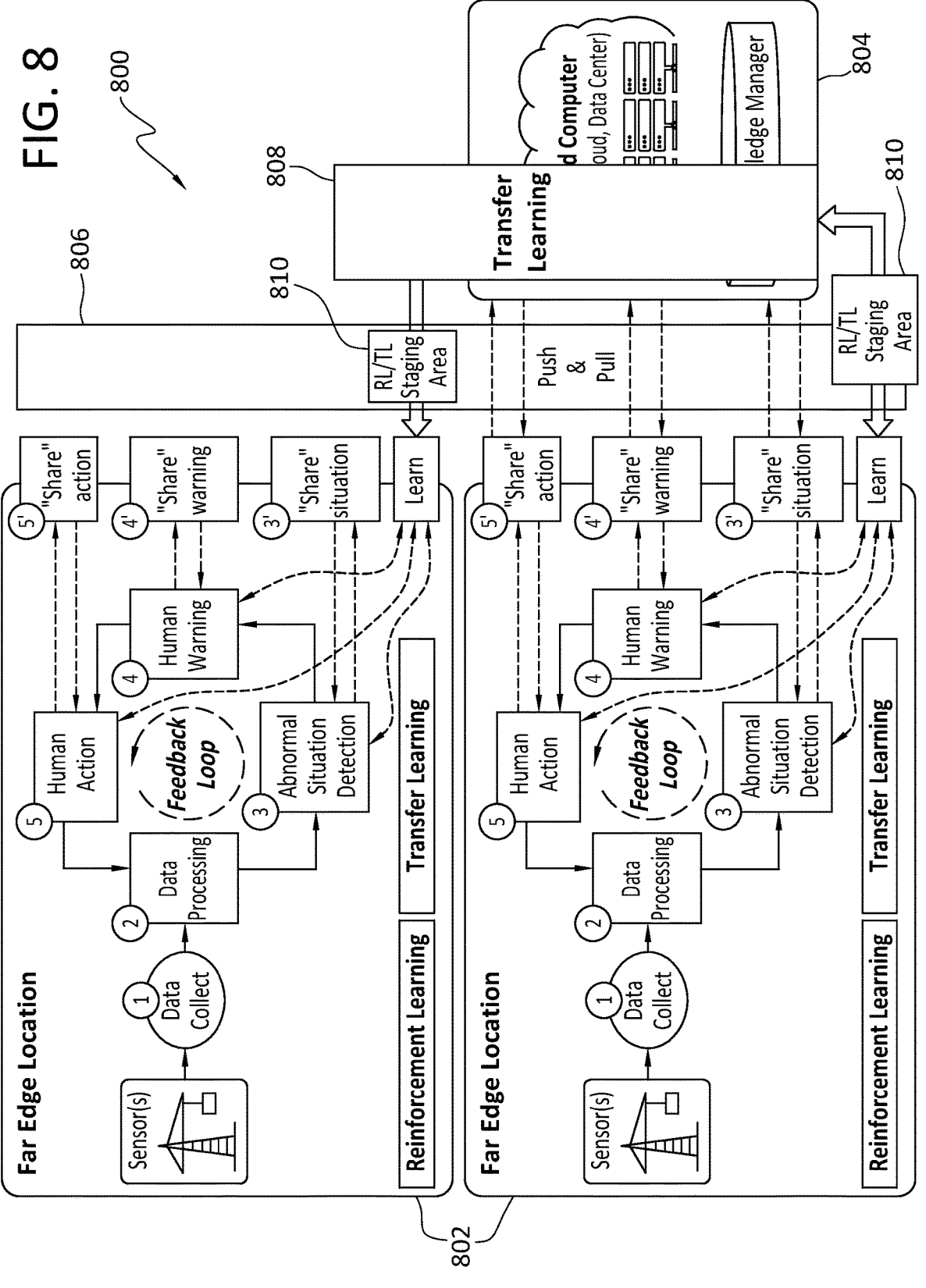
FIG. 8 discloses use of RL/TL staging areas for learnings sharing.

With particular reference now to the example of FIG. 8, a configuration 800 is disclosed that may include various far edge sites 802 that are able to communicate with a central knowledge manager 804 by way of a knowledge sharing mechanism 806. A transfer learning platform 808 may be provided that may operate as a stand-alone entity, or may be hosted at the central knowledge manager 804. Respective staging areas 810 may be provided for each of the far edge sites 802. Various other components, and their operations, disclosed in FIG. 8 are discussed in detail in connection with other figures, and so are not addressed here.

In more detail, the staging areas 810 may comprise dynamic repositories that advertise, such as by way of a catalog-like service, available learnings bundled, for context, with variable length SWA (Situation-Warning-Action) associative arrays. The staging area 810, in effect, announces to its own far edge site 802, and to the global population of far edge sites 802, the learnings that it has available. Upon an internal request from its own far edge site 802, a staging area 810 works with its edge RL/TL componentry to move, that is, incorporate, potential learnings into the local service, which may comprise a knowledge base. Particularly, each staging area 810 may implement a respective knowledge catalog on behalf of its edge site 802 that showcases to other edge sites 802 the learnings that the local edge site 802 had produced recently or over a period of time, since each edge site 802 may operate on its own respective time scale. An example technical architecture for implementation of knowledge management and sharing is disclosed in FIG. 9.

Figure 9:
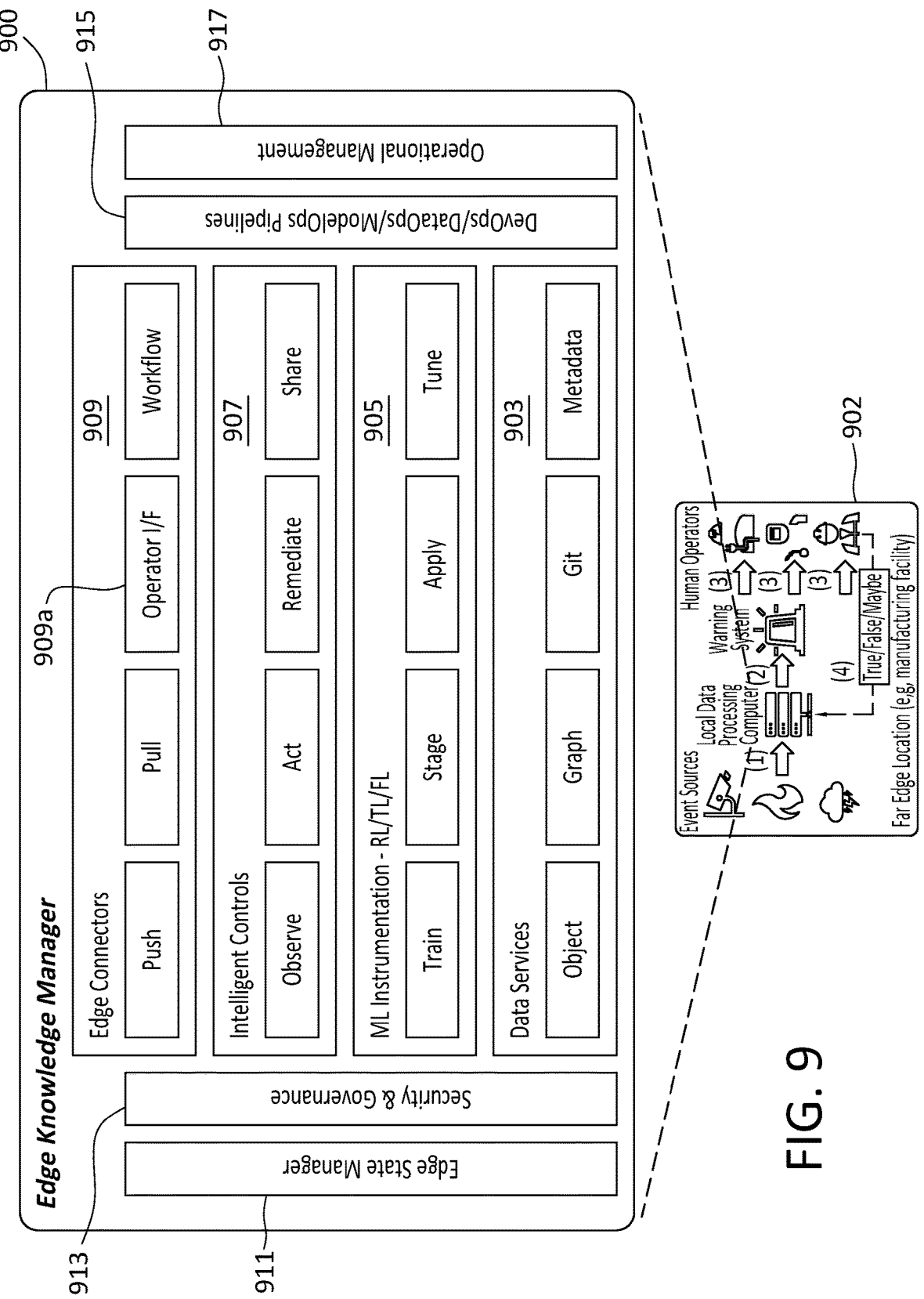
FIG. 9 discloses an edge knowledge manager technical architecture.

In particular, FIG. 9 discloses a edge knowledge manager technical architecture, one example of which is denoted at 900. In general, and as shown, a respective instance of the edge knowledge manager (EKM) 900 may be implemented at each far edge site 902 of a group of far edge sites.

In more detail, and beginning from the bottom layer of EKM 900, the data services layer 903 may provide all the data storage, lineage, and access needed by the layers above it. A Git-like, or versioning, capability may be included in the data services layer 903 to turn it into a versioning-as-a-service (VaaS) function that all components of the stack can use instead of constructing their own. This versioning capability may be particularly useful as versioning, such as of data, models, system states, and responses for example, may be an important aspect of the overall functionality of some embodiments.

With continued reference to the example of FIG. 9, the EKM 900 may include an ML instrumentation layer 905 which may comprise a collection of componentry and capabilities needed for ML models lifecycle management. As shown, such componentry and capabilities may include, for example, training, staging, application, and tuning.

Next in the EKM 900 is the intelligent controls layer 907 which is where application of the learnings is implemented. Conventional approaches tend to blur the line between the learning, and the application of learning, and such approaches in which little or no separation of roles is provided, that is, separation between model training and model inferencing for example, do not give good visibility into what needs to be done to improve the response of the system to future situations that may or may not have been encountered by the system.

For example, in the case of a collision between two forklifts that also caused loss of lives, did the collision occur because the models were still learning? Or was it because the models produced the correct prediction, however the brake actuators failed to engage? Being able to distinguish between learning and application helps find the correct root cause and fix it accordingly. Consider another example in which a system failed to generate a Dangerous CO2 Level Warning in less than one second after an elevated $CO_2$ level was detected. Did this failure occur because the learning failed to detect the abnormal State S(t), or did the failure occur because the algorithm failed to trigger an adequate and timely Action A(t+1) (see FIG. 7)? As these examples illustrate, separating learnings and controls into their own respective domains, and allowing the learnings and controls to evolve separately from each other, may better provide the proper level of visibility into where the real cause and, hence, the opportunity for improvement, lies.

With continued reference to FIG. 9, at the top of the stack in the EKM 900 is an edge connector layer 909 that may comprise the edge connectors needed for the far Edge Location 902 to interact with other sites and with the central knowledge manager (not shown in FIG. 9). The edge connector layer 909 may also be responsible to interact with human operator via the human I/F (interface) service 909a.

Finally, alongside the stack in the EKM 900 may sit various managers and services. For example, there may be provided an edge state manager 911 which may supervise the functional state of the instance, security and governance services 913, DevOps/DataOps/ModelOps Pipelines 915, and operational management services 917. Additional or alternative managers and services may be provided in other embodiments.

C. System Global State Management

Another aspect of some example embodiments is in coordinating and managing the composite state of the system at large. As noted earlier herein, any attempt to impose hard rules that all far Edge Locations should abide to is likely to render the overall system unable to meet expectations over some period of time. The opposite approach to this "hard rule" idea is to let each far edge site location operate completely independently, with some level of knowledge sharing in the background, and hope that certain behaviors will start collating and eventually yield new actions and new responses. While this is theoretically possible, putting it in practice makes the whole effort extremely cost prohibitive.

In contrast with such approaches, some example embodiments may implement an approach in which each far edge site is permitted to operate at least somewhat autonomously while also taking advantage of learnings gathered elsewhere, such as at other far edge sites for example. Further, some embodiments may operate to keep the overall system in check while it continues to learn new signals, new actions, and new responses. Permitting each far edge site to operate somewhat autonomously while still maintaining certain level of central control may then become a problem of managing a collection of loosely coupled micro-states and macro-states. As used herein, system micro-states pertain to far Edge Locations and are used for describing the functional evolution of each far Edge Location. On the other hand, as used herein, system macro-states pertain to the overall system and are a mechanism to describe how the overall system has been, and is, evolving. An example process that may be used in some embodiments to manage micro-states is disclosed in FIG. 10, which discloses an example micro-state selection and activation flow 1000 according to some embodiments.

Figure 10:
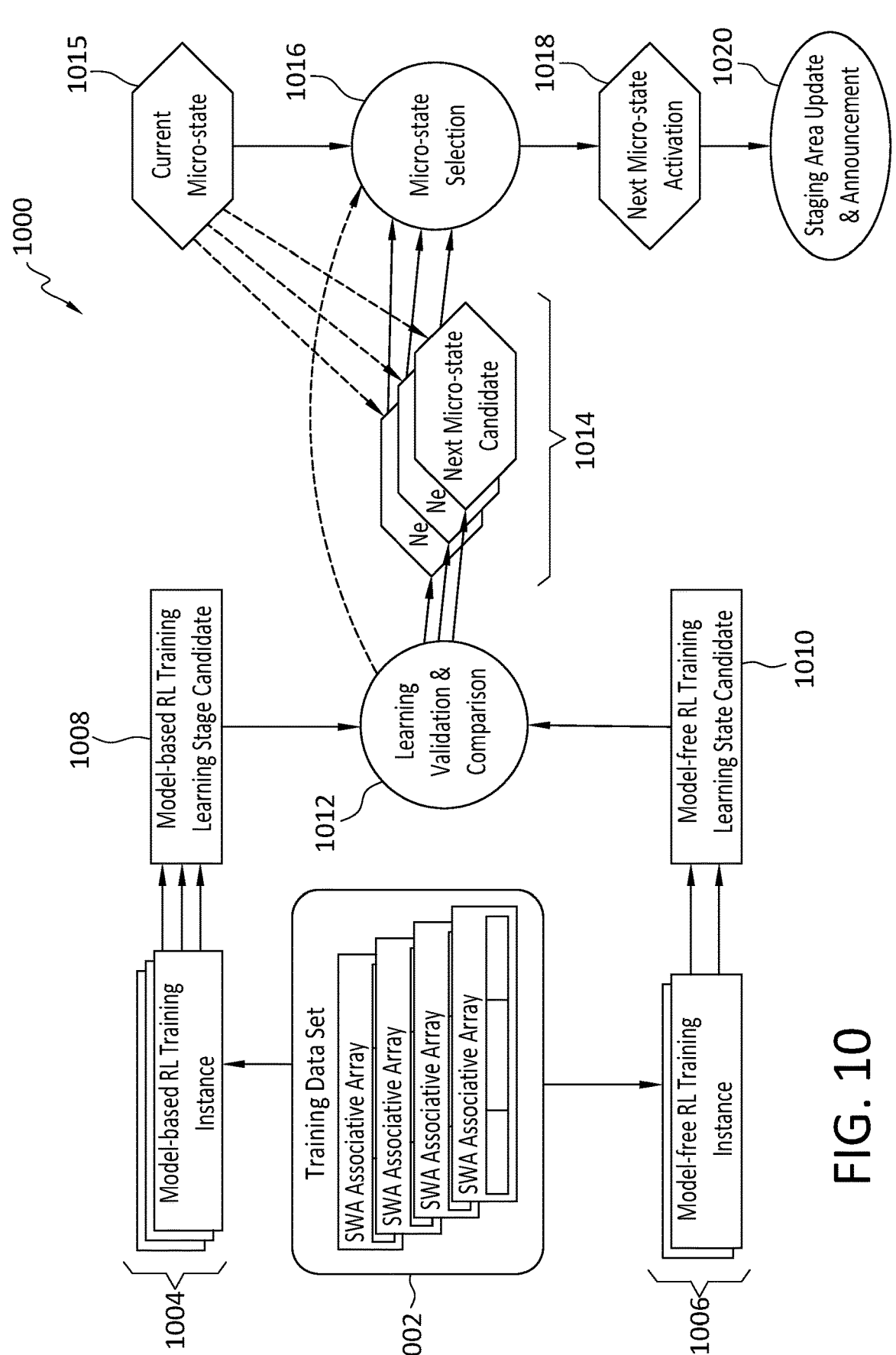
FIG. 10 discloses a micro-state selection & activation flow.

As shown in FIG. 10, an RL training data set 1002 may comprise Situation-Warning-Action combinations, possibly implemented as associate arrays. Next, the flow in FIG. 10 may employ both model-based 1004, and model-free 1006, RL models, and embodiments may run multiple instances of both workstreams, that is, RL models, to accelerate the training phase of the ML model development.

At some point, both model-free, and model-based, training workstreams may produce candidates that presumably meet the requirements of the next learning stage, namely, these candidates may comprise model-based RL training learning stage candidates 1008 and model-free RL training learning stage candidates 1010. The model candidates may then be compared 1012, and one model may be selected.

To activate the selected model, some embodiments may generate several permutations 1014 of the current micro-state 1015 as next micro-state candidates which include the selected candidate RL model along with different levels of variability in its operational parameters. The reason behind generation of multiple next state candidates, instead of employing only a single candidate, is to accommodate any last minute environment changes that may have occurred since the models were trained. Without the generation and use of multiple next micro state candidates, the edge subsystem may sooner or later get stuck in an infinite learning loop. After the next micro state candidates have been generated, one of those next micro state candidates may be selected 1016.

Once the next micro-state is selected 1016 and activated 1018, corresponding updates may be pushed to the staging area of that particular far edge instance and notifications may go out 1020 from that far edge instance to all the other far edge instances and to the central manager. Lastly, transfer learning agents may be activated on demand and latest iteration of learnings shared across the macro system.

It should be noted that each far Edge Location may run multiple instances of the process outlined above and disclosed in FIG. 10, one instance for each situation. The high volume of ML workstreams targeting a broad variety of learning tracks is supported by the ML Instrumentation layer 905 in the stack architecture disclosed in FIG. 9, and may also be supported by the consolidation and reuse of most of the ML componentry such as the tools Spark, Dask, Kedro, and MLflow, for example. One example digital representation of this collection of loosely coupled micro-states may use DAGs (Directed Acyclic Graph) to represent various micro-states and their relationships to other micro-states.

Figure 11:
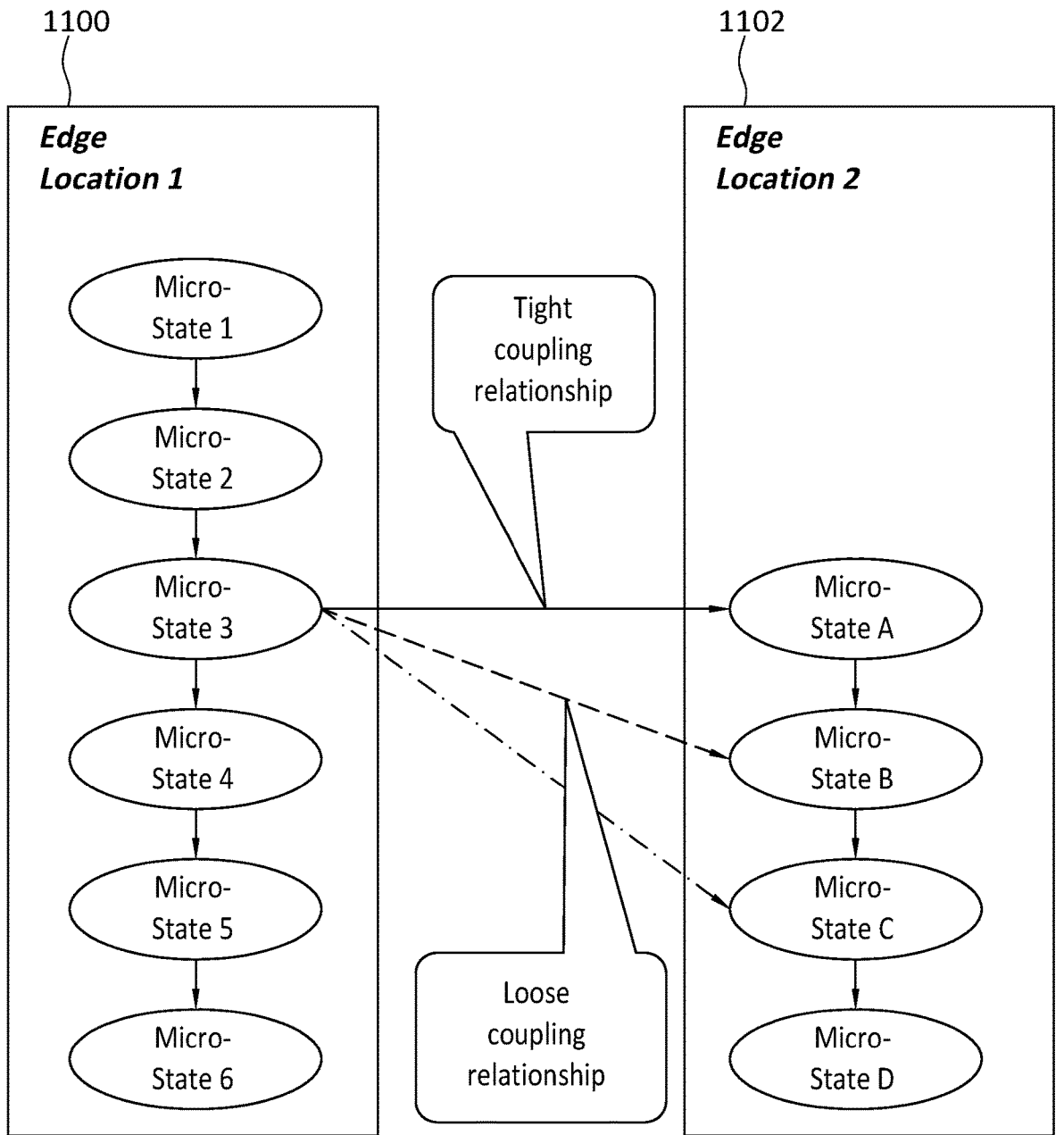
FIG. 11 discloses operational state relationships between Edge Locations.

Turning next to FIG. 11, an arrangement is disclosed in which two far Edge Locations, or sites, 1100 and 1102 are evolving, over time, through their own micro-states as each far Edge Location learns new situations and shares new learnings. Particularly, FIG. 11 discloses example operational state relationships between far Edge Locations.

As shown in the example of FIG. 11, far Edge Location 1100 started earlier than far Edge Location 1102, and the operational micro-states of far Edge Location 1100 are micro-state 1 through 6. On the other hand, far Edge Location 1102 started later and, to kickstart its own learning journey, it uses TL to, in effect, borrow learnings from far Edge Location 1100. In this illustrative example, the most relevant learnings to kickstart the learning journey of Edge Location 1102 are deemed to be the learnings gathered in micro-state 3 of Edge Location 1100. The process of borrowing Edge Location 1100 micro-state 3 learnings for Edge Location 1102 micro-state 'A' enactment may create a tight coupling between Edge1_MS-3 and Edge2_MS-A. Subsequent far Edge Location 1102 micro-states may be loosely coupled back to far Edge Location 1100 MS-3, and/or to other micro-states of far Edge Location 1100. The level of coupling may become weaker as far Edge Location 1102 adds newer micro-states while far Edge Location 1100 continues its own learning journey.

It is noted that the borrowing of learnings by one far Edge Location from another far Edge Location may be conducted under the supervision of a central controller such as may be hosted by a central knowledge manager, or by a centralized compute site. The physical transfer of the model binary package between two or more far Edge Locations may be implemented by way of point-to-point connections between the respective staging areas of each far Edge Location (see FIG. 8).

Because managing a system of this scale—which may include hundreds, thousands, millions, or more, far Edge Locations—via tiny, and numerous incremental micro-states at each far Edge Location makes the management job unnecessarily complex and difficult to scale, some example embodiments may simplify the implementation by clustering micro-states across multiple far edge sites. Such clusters may be referred to herein as macro-states. A macro-state may comprise a real-time snapshot of the operational state of the overall system at a particular point in time.

The macro-state information may be used by some embodiments to identify macro-level operational patterns, such as, for example, (a) the learning seems to stall when far edge RL algorithms presented with Situation_A (warehouse door lost power in open position), or (b) the system fails to put out Warning_X (turn warehouse door warning lights on), or (c) the system must be ready to take Action_102 (stop forklift from entering zone). Once a systemic challenge, that is, a system-wide challenge, such as the examples just noted, has been identified, example embodiments may operate to accelerate the RL learning by allocating more resources such as, for example, containers, CPU, RAM, network I/O, to the ML instrumentation layer (see reference 905 in FIG. 9) across multiple far Edge Locations. Allocating more resources in this way may lead to faster learning cycles which, in turn, may lead to more effective response(s) to one or more system-wide challenges, whether such challenges are known or not previously seen.

Figure 12:
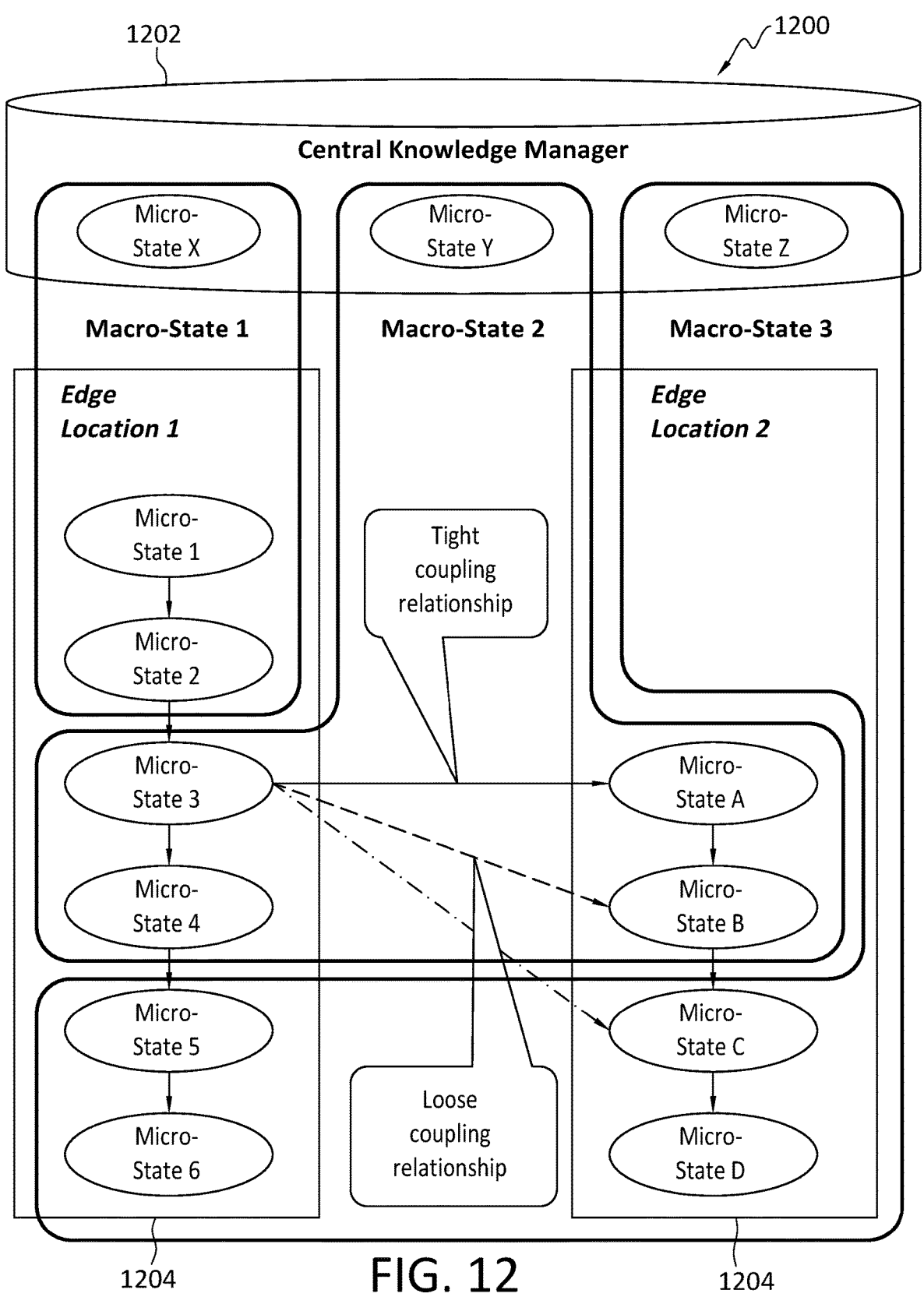
FIG. 12 discloses macro-states and micro-states representations.

With reference now to FIG. 12, an example macro-states and micro-states representation 1200 is disclosed. Particularly, FIG. 12 discloses various macro-states which, in addition to a series of properties, group a finite number of micro-states together. In the illustrative example of FIG. 12, the grouping of micro-states into clusters, or macro-states, may be performed by a central knowledge manager 1202 that is operable to communicate with one or more far Edge Locations 1204, each of which is associated with a respective group of one or more micro-states.

As disclosed there, for example, a macro-state 2 may comprise micro-states 3 and 4 of Edge Location 1, as well as micro-states A and B of Edge Location 2. A micro-state Y defined at the central knowledge manager 1202 may also be included in the macro-state 2. Note that, similar to the case of a far Edge Location 1204 moving from one micro-state to another micro-state, a system may evolve, over time, from one macro-state to another macro-state. Further, and as indicated in FIG. 12, a given system may be in various different macro-states at the same time, where each macro-state may correspond to a different respective situation or circumstance.

D. Example Use Case

Following is a discussion of an example use case for some embodiments of the invention. This use case, which concerns forklift operations, is provided only by way of illustration and is not intended to limit the scope of the invention in any way.

Particularly, this example use case concerns warehouse safety, specifically, an environment in which a forklift could hit and damage an object or personnel. The object or personnel may be static, or may be moving. Based on safety standards, the elapsed time from detection of an actual, or potential, collision involving the forklift, to notification/action must be 0.2 sec or less.

An Inertial Measurement Unit (IMU) electronic sensor device may be used that measures and reports a forklifts specific force, angular rate, and forklift orientation, using a combination of accelerometers, gyroscopes, and sometimes magnetometers. Some IMUs may also include GPS (global positioning system) sensors if operating in an outdoor scenario or RFID (radio frequency identification) positioning tags if operating in an indoor scenario. Data gathered by the IMU sensors may be fed to sensor fusion for analysis/processing and capture of raw data as telemetry data.

The sensor fusion layer may perform real-time analysis, including ML inferencing, of IMU sensor data with the policy layer to determine if the forklift is going to hit another object. If this is the case, an event notification is generated, and action taken. Example actions could be stopping the forklift and/or notifying the operator of an impending collision through an audible and/or visual warning.

Incident detection events may be sent upstream as fast as data is received and insights are available for further processing and systemic analysis. Subsequently, the original (raw) data may be shared upstream, such as by way of relatively slower data channels, for long term analysis and improving ML inferencing model through reinforcement learning, transfer learning, and federated learning.

E. Example Methods

Figure 13:
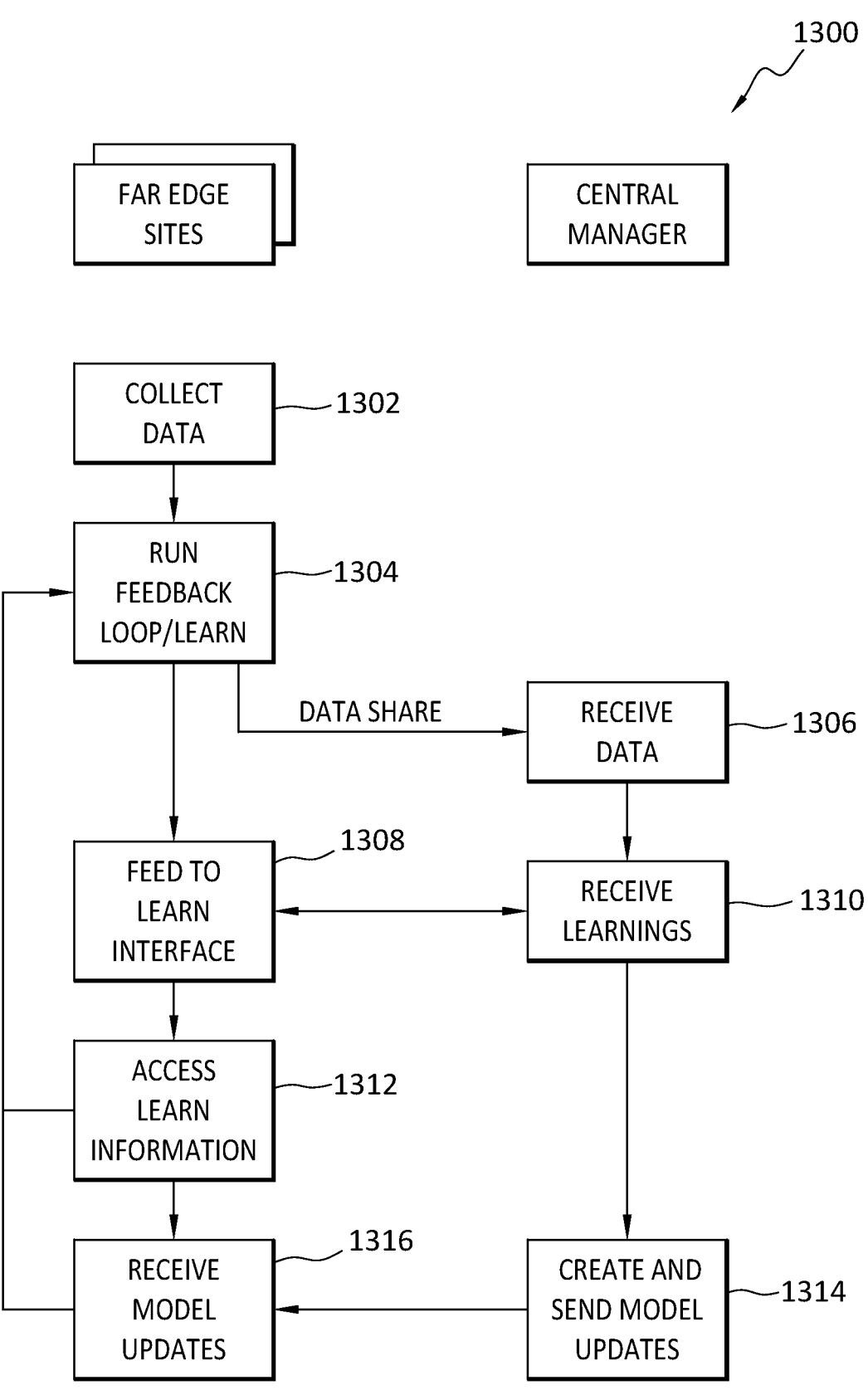
FIG. 13 discloses aspects of an example method for knowledge sharing and collaborative learning.

It is noted with respect to the disclosed methods, including the example method of FIG. 13, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 13, one example method according to some embodiments is indicated at 1300. The method 1300 may be performed collaboratively by one or more far edge sites, and a central manager.

The method 1300 may begin with the collection of data 1302 by far edge devices, such as IoT devices for example. The data may concern, for example, the operation of equipment such as may potentially be involved in a situation that could cause harm to humans and/or property. The data may be fed to a feedback loop that may be run 1304 as part of a learning process at the far edge device.

The data gathered at 1302 may also be shared with a central manager, which may receive 1306 data from one or more far edge sites. In this way, for example, the central manager may maintain an awareness of the overall state of the system since the central manager may receive 1306 data from multiple far edge sites.

At 1308, learning information, which may comprise various outputs of different stages of the feedback loop, may be fed to a learn interface that is able to communicate with the central manager. Each far edge site may have its own respective learn interface. The learning information may also be transmitted to, and received 1310 by, the central manager. In this way, the central manager may serve as a collection point for learnings received from a group of far edge sites.

The far edge sites may also access 1312 the learning information stored at the central manager and/or learning information stored at one or more far edge sites. This learning information may then be used in additional cycles of the feedback loop 1304. In this way, each far edge site may benefit from the experience of other far edge sites with regard to particular situations and circumstances, and may thus 'learn' lessons without actually having to experience the same problems as other far edge sites.

The central manager may also, based on the data received 1306 and learnings receive 1310, create and send updates 1314 to one or more models running at the far edge sites. The far edge sites may receive 1316 and incorporate the model updates, and then run further feedback loops and learning processes 1304.

Thus, the example method 1300 may enable the sharing of knowledge, information, and data among group of existing, and possibly new, far edge sites. In this way, the far edge sites may collectively, and collaboratively, learn and improve their own respective operations.

F. Further Example Embodiments

Following are some further example embodiments of the invention. These are presented only by way of example and are not intended to limit the scope of the invention in any way.

Embodiment 1. A method, comprising: performing, at a far edge device, operations comprising: collecting data with one or more IoT (Internet of Things) devices; feeding the data to a feedback loop that includes multiple stages; running the feedback loop; providing learning information, comprising output from one or more of the stages of the feedback loop, to a central manager by way of a learn interface; accessing learning information generated by one or more other far edge devices; and updating the feedback loop using the learning information generated by the one or more other far edge devices.

Embodiment 2. The method as recited in embodiment 1, wherein the data comprises data about an impending situation which, if the situation occurs, presents a threat to life and/or property.

Embodiment 3. The method as recited in any of embodiments 1-2, wherein running the feedback loop comprises: processing the data; detecting an abnormal situation indicated by the data; generating a warning to a human, wherein the warning concerns the abnormal situation; and receiving input indicating that the human has taken an action regarding the abnormal situation.

Embodiment 4. The method as recited in any of embodiments 1-3, wherein the operations further comprise running the feedback loop after it has been updated.

Embodiment 5. The method as recited in any of embodiments 1-4, wherein the operations further comprise determining a macro-state for a system that includes the far edge device and the one or more other far edge devices.

Embodiment 6. The method as recited in embodiment 5, wherein the macro-state is specific to a particular situation.

Embodiment 7. The method as recited in embodiment 5, wherein the macro-state is determined based upon one or more micro-states of one or more of the far edge devices.

Embodiment 8. The method as recited in any of embodiments 1-7, wherein the learning information is advertised by the far edge device to one of the one or more other far edge devices.

Embodiment 9. The method as recited in any of embodiments 1-8, wherein the feedback loop is updated using a transfer learning process.

Embodiment 10. The method as recited in any of embodiments 1-9, wherein the far edge site operates autonomously with respect to the one or more other far edge sites, while also incorporating learnings generated by the one or more other far edge sites.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 14:
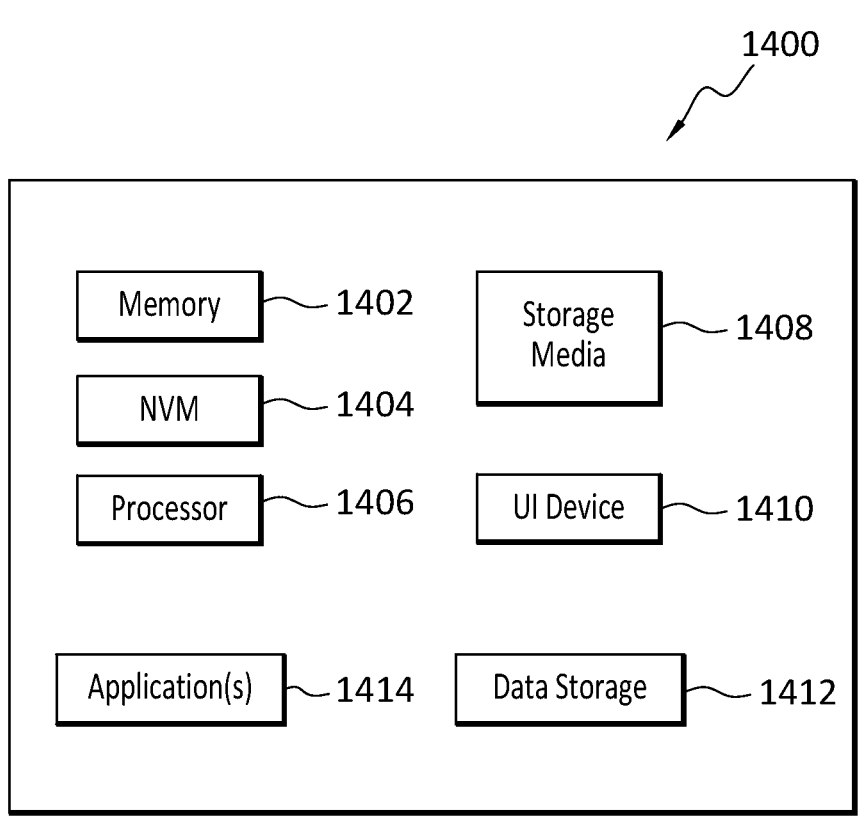
FIG. 14 discloses aspects of a computing entity operable to perform any of the disclosed methods, processes, and operations.

With reference briefly now to FIG. 14, any one or more of the entities disclosed, or implied, by FIGS. 1-13 and/or elsewhere herein, may take the form of, or include, or be implemented on, or hosted by, a physical computing device, one example of which is denoted at 1400. As well, where any of the aforementioned elements comprise or consist of a virtual machine (VM), that VM may constitute a virtualization of any combination of the physical components disclosed in FIG. 14.

In the example of FIG. 14, the physical computing device 1400 includes a memory 1402 which may include one, some, or all, of random access memory (RAM), non-volatile memory (NVM) 1404 such as NVRAM for example, read-only memory (ROM), and persistent memory, one or more hardware processors 1406, non-transitory storage media 1408, UI (user interface) device 1410, and data storage 1412. One or more of the memory components 1402 of the physical computing device 1400 may take the form of solid state device (SSD) storage. As well, one or more applications 1414 may be provided that comprise instructions executable by one or more hardware processors 1406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing, by a model running on a far edge knowledge manage instance at a far edge device, operations comprising:
collecting data with one or more IoT (Internet of Things) devices;
feeding the data to a feedback loop that includes multiple stages;
running the feedback loop;
providing learning information, comprising output from one or more of the multiple stages of the feedback loop, to a central manager by way of a learn interface;
accessing learning information, which is generated by the central manager based on data fed by one or more other far edge devices; and
updating the model using the learning information generated by the central manager based on the data fed by the one or more other far edge devices,
wherein the far edge device operates autonomously with respect to the one or more other far edge devices, while also incorporating learnings generated by the one or more other far edge devices.

2. The method as recited in claim 1, wherein the data comprises data about an impending situation which, if the impending situation occurs, presents a threat to life and/or property.

3. The method as recited in claim 1, wherein running the feedback loop comprises:
processing the data;
detecting an abnormal situation indicated by the data;
generating a warning to a human, wherein the warning concerns the abnormal situation; and
receiving input indicating that the human has taken an action regarding the abnormal situation.

4. The method as recited in claim 1, wherein the operations further comprise running the feedback loop after it has been updated.

5. The method as recited in claim 1, wherein the operations further comprise determining a macro-state for a system that includes the far edge device and the one or more other far edge devices.

6. The method as recited in claim 5, wherein the macro-state is specific to a particular situation.

7. The method as recited in claim 5, wherein the macro-state is determined based upon one or more micro-states of the one or more other far edge devices and the far edge device.

8. The method as recited in claim 1, wherein the learning information is advertised by the far edge device to one of the one or more other far edge devices.

9. The method as recited in claim 1, wherein the feedback loop is updated using a transfer learning process.

10. A non-transitory storage medium having stored therein instructions that are executable by one or more hardware processors of a far edge device to perform operations, by a model running on a far edge knowledge manage instance, comprising:

collecting data with one or more IoT (Internet of Things) devices;

feeding the data to a feedback loop that includes multiple stages;

running the feedback loop;

providing learning information, comprising output from one or more of the multiple stages of the feedback loop, to a central manager by way of a learn interface;

accessing learning information, which is generated by the central manager based on data fed by one or more other far edge devices; and updating the model using the learning information generated by the central manager based on the data fed by the one or more other far edge devices, wherein the far edge device operates autonomously with respect to the one or more other far edge devices, while also incorporating learnings generated by the one or more other far edge devices.

11. The non-transitory storage medium as recited in claim 10, wherein the data comprises data about an impending situation which, if the impending situation occurs, presents a threat to life and/or property.

12. The non-transitory storage medium as recited in claim 10, wherein running the feedback loop comprises:

processing the data;

detecting an abnormal situation indicated by the data;

generating a warning to a human, wherein the warning concerns the abnormal situation; and receiving input indicating that the human has taken an action regarding the abnormal situation.

13. The non-transitory storage medium as recited in claim 10, wherein the operations further comprise running the feedback loop after it has been updated.

14. The non-transitory storage medium as recited in claim 10, wherein the operations further comprise determining a macro-state for a system that includes the far edge device and the one or more other far edge devices.

15. The non-transitory storage medium as recited in claim 14, wherein the macro-state is specific to a particular situation.

16. The non-transitory storage medium as recited in claim 14, wherein the macro-state is determined based upon one or more micro-states of the one or more other far edge devices and the far edge device.

17. The non-transitory storage medium as recited in claim 10, wherein the learning information is advertised by the far edge device to one of the one or more other far edge devices.

18. The non-transitory storage medium as recited in claim 10, wherein the feedback loop is updated using a transfer learning process.

\* \* \* \* \*